UNITED STATES PATENT OFFICE.

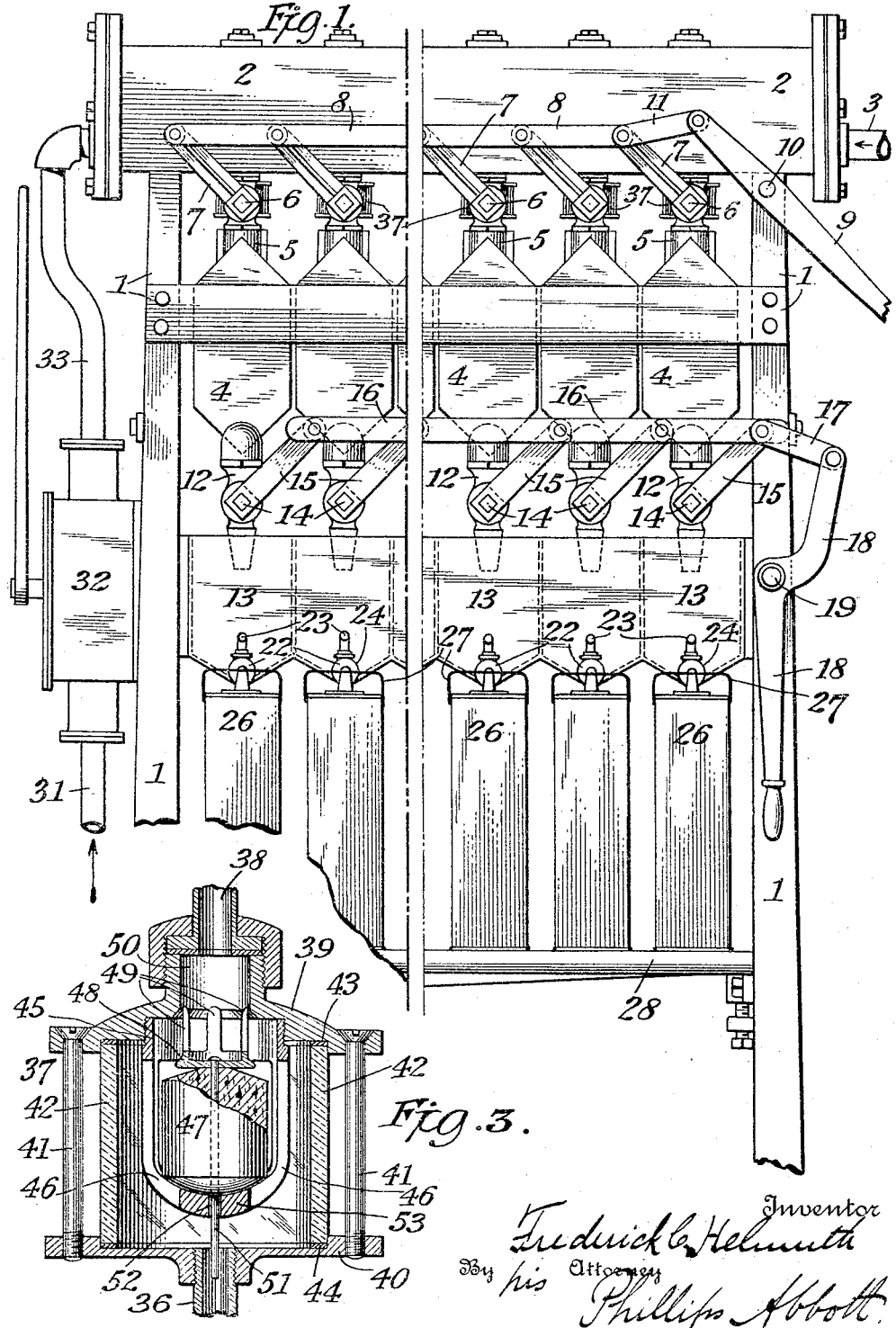
F. C. HELMUTH.
MULTIPLE FILLING APPARATUS.
APPLICATION FILED NOV. 12, 1915.
1,213,362.
Patented Jan. 23, 1917.
2 SHEETS—SHEET 1.

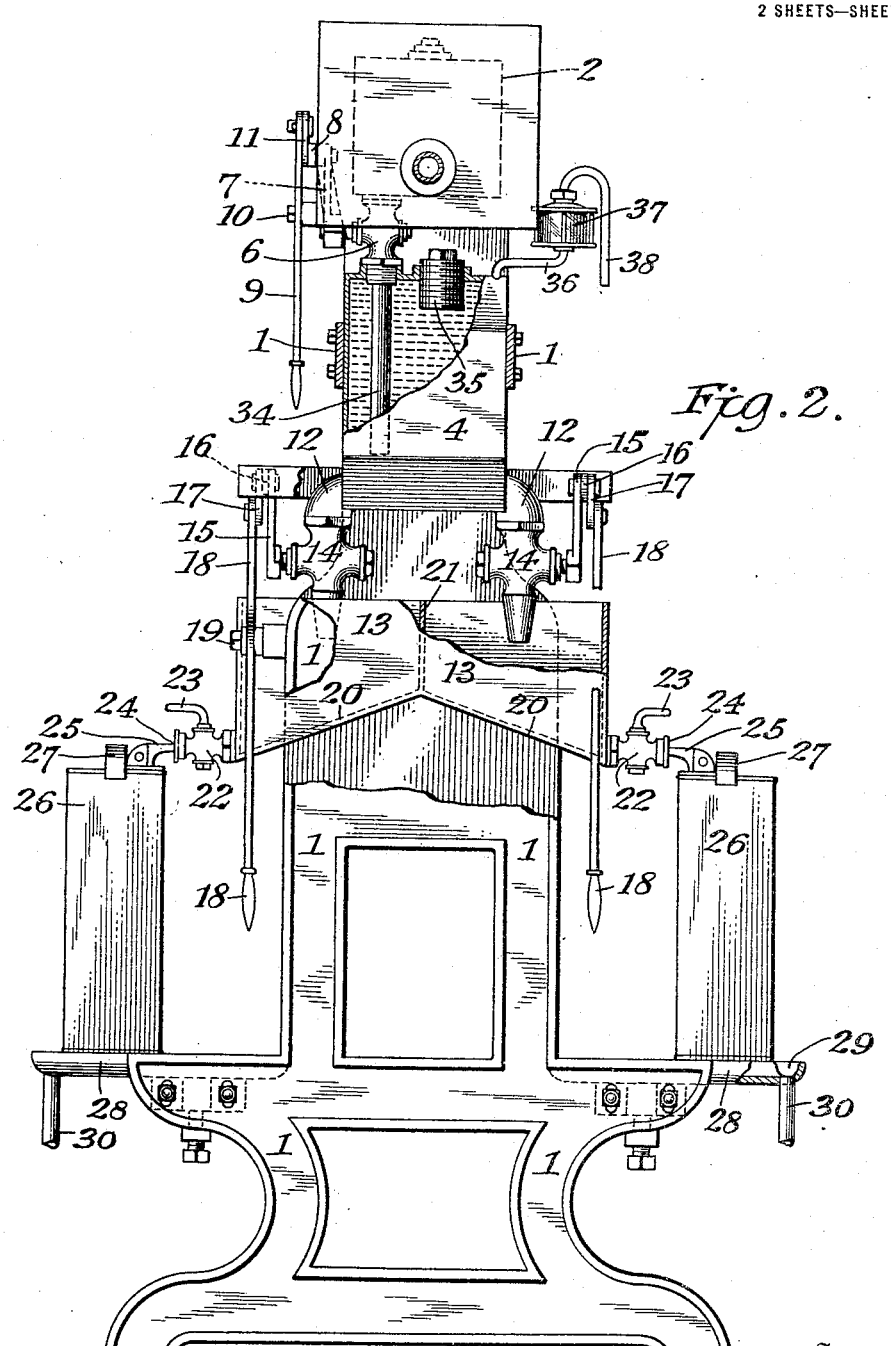

FREDERICK C. HELMUTH, OF LYNBROOK, NEW YORK, ASSIGNOR TO STANDARD OIL COMPANY, OF NEW YORK, OF NEW YORK, N. Y., A CORPORATION OF NEW YORK.

MULTIPLE FILLING APPARATUS.

1,213,362.   Specification of Letters Patent.   Patented Jan. 23, 1917.

Application filed November 12, 1915. Serial No. 61,019.

*To all whom it may concern:*

Be it known that I, FREDERICK C. HELMUTH, a citizen of the United States, and a resident of the village of Lynbrook, county of Nassau, and State of New York, have invented certain new and useful Improvements in Multiple Filling Apparatus, of which the following is a specification.

In apparatus of the class stated, where a large number of vessels, each having a stated capacity, are to be rapidly and accurately filled with a liquid, as, for example, milk, kerosene, medicines, chemicals and the like, experience has shown that it is desirable to have a superposed reservoir from which the liquid is supplied to a series of measuring receptacles so constructed as to accurately determine the amount of liquid thereafter to be delivered to the vessels to be filled. There are of course suitable pipes or conduits provided which connect the reservoir with the series of measuring receptacles and also the latter with the series of vessels to be filled, and these pipes are provided with stop cocks, or equivalent cut-offs, equipped with means whereby each set may be simultaneously opened and closed.

In the practical operation of such multiple filling apparatus a serious objection is encountered in that the measuring receptacles, for a series of reasons, will not all fill in exactly the same time. Some of them will invariably fill slightly before the others, and since it is necessary that there shall be a vent pipe for each of the measuring receptacles in order to permit escape of the air upon the incoming of the liquid, there is inevitably more or less spilling of the liquid at these vent pipes, or, as they are called, spill pipes, from the measuring receptacles which fill first, because the operator, in order that he may be assured that all the measuring receptacles are full, must be watchful and see that all of the spill pipes are dripping before he can shut off the supply from the reservoir. This "spill," as it is called, is caught in a suitable receptacle, from which it is subsequently pumped back to the source of supply. This procedure occasions considerable loss of the liquid, loss of time, necessitates great watchfulness on the part of the operator, and in some instances has a degrading or injurious effect upon the liquid thus spilled.

It is the purpose of this invention, therefore, to provide means whereby the foregoing objection is obviated and other advantages not heretofore realized secured.

Referring to the drawings, Figure 1 is an elevation, broken away between its ends and also at its lower part, of a multiple filling apparatus embodying the invention, adapted to be beneficially used in the filling of oil cans; Fig. 2 is an endwise elevation of the apparatus shown in Fig. 1, partly broken away to show certain portions in section; Fig. 3 is a vertical sectional view, certain of the parts being shown in elevation, illustrating one form of construction of one of the valves which control the operation of filling the measuring receptacles.

In the drawings, 1 represents a frame, usually cast iron, which supports the apparatus.

2 is the reservoir erected upon the upper end of the frame 1.

3 is the reservoir filling pipe, which leads to a tank, or other primary source of supply.

4, 4, are a series of measuring receptacles, each supplied with a filling pipe 5 connecting with the reservoir, as shown, and each having a stop cock 6, provided with an arm 7, which is pivotally connected to a bar 8 operated by a lever 9, which is pivoted at 10 to some suitable part of the apparatus and connected with the bar 8 by a link connection 11. 12 are a series of flow away pipes, which permit the liquid to pass from the measuring receptacles 4 into a series of funnels 13. Each flow away pipe 12 is provided with a stop cock 14, which has an arm 15. Each of the arms 15 on each side of the apparatus is pivotally connected to a bar 16 connected by a link 17 with a lever 18 pivotally supported at 19 to some suitable fixed part of the apparatus, so that there are two levers 18 and their co-acting devices.

The funnels (see Fig. 2) preferably have inclined bottoms 20, and are divided by a vertical partition 21, and the capacity of the measuring receptacles 4 is such that each will contain sufficient liquid to fill one of the cans or other vessels to be filled. Consequently there are two series of flow away pipes 12, one series on each side of the apparatus, as shown in Fig. 2, each having its own operating devices for alternately discharging the contents of the measuring receptacles into the opposite chambers of the funnels formed by the partitions 21.

At the lower corner or edge of each half of each funnel there is a stop cock 22, provided with a handle 23, and a mouthpiece 24, which may, if desired, be supplied internally with cork, leather, or rubber packing, so as to receive water tight the nozzle 25 of the can or vessel 26, to be filled. If the can or vessel to be filled is not equipped with a hollow nozzle, which being turned about its axis acts as a stop cock or faucet, which construction is well understood in oil cans, then the mouthpiece 24 of the stop cock 22 may be fashioned as desired to properly deliver the contents of the funnels into the vessels to be filled, whatever their form and construction may be. This detail is immaterial.

27 are the handles for the cans.

In the instance shown the cans are supported upon a table or slab 28 provided near its edge with a gutter 29 and drain pipe 30, which connects with a suitable receptacle from which a pipe 31 (see Fig. 1) connecting with a pump 32, and delivery pipe 33, pumps the spill liquor, if there be any, back again to the reservoir 2.

Each of the measuring receptacles (see Fig. 2) is provided with a filling tube 34, which extends from the stop cock 6 down to near the bottom of the measure, for the well known purpose of preventing foaming and each of them is also provided with a so-called displacer 35, which by appropriate adjustment of the degree of its interior projection, will exactly compensate for defects or irregularities in the construction of the measuring receptacles, thus securing accuracy in their fluid content. Each of the measuring receptacles is also provided with a vent and overflow pipe 36, which connects with an automatically acting valve 37, which in turn is provided with an overflow pipe 38.

The construction of the valve is best shown in Fig. 3. It comprises an upper and lower plate, 39 and 40, respectively, which are preferably brass castings. They are connected by screw bolts 41.

42 is a short cylinder, preferably of glass, which is clamped in position between the upper and lower plates 39 and 40, and is provided on its upper and lower edges with packings or gaskets 43 and 44, so that when the plates are drawn together by the screw bolts 41, the device will be made tight.

The upper plate 39 is provided with a cage 45, which may be threaded to it as shown, and which has a series of openings or slots 46, so that liquid and air, one or both, can readily pass into it and within the cage is a float 47, which may be of cork, as shown, or of any other material, and of such construction as preferred. It is provided with a valve closure 48 on its upper surface, which has a series of upwardly extending guiding fingers 49, which work in the cylindrical part 50 of the upper plate 39 and thus accurately guide the valve closure to its seat. A valve stem 51 projects downwardly from the bottom of the float, passing through a guide hole 52 in the lower web 53 of the cage, thus guiding the valve below.

The operation of the apparatus as thus described is obvious.

The stop cocks 6 are all closed by appropriate manipulation of the lever 9 and co-acting parts and the stop cocks 14 are likewise closed by appropriate manipulation of the lever 18 and its co-acting parts. The liquid is then allowed to pass from the source of supply into the reservoir 2 until it is full, or has received adequate supply. Thereupon, by appropriate manipulation of the lever 9, all of the stop cocks 6 are simultaneously opened and the liquid will simultaneously flow from the reservoir into each of the measuring receptacles 4. During the filling operation the pipes 34 prevent foaming to a large extent at least and the displacer 35 secures the absolutely correct amount which each of the measuring receptacles should contain. As the liquid rises in the measuring receptacle the air is expelled through the pipe 36 and valve 37, blowing out through the pipe 38. When the measuring devices are filled with liquid, all the air having passed out through the valves 37, the liquid, the inflowing of which has not yet been stopped, will rise through the pipe 36 and enter the valve casing and almost immediately will lift the valve closure 48 against its seat, whereupon all further inflowing of the liquid from the reservoir to the measuring receptacle will automatically cease.

It will be noted that in the particular instance illustrated, the liquid contained within the pipe 36 and in the lower part of the valve casing will be in excess of the complete filling of the measuring receptacles and this is a special feature of this invention, because by changing the location of the valve relative to the top of the measuring receptacle, and by changing the area of the pipe 36, and the size of the valve casing, any desired adjustment of the contents of the measuring receptacle can be secured. Such exactitude will not be necessary in most cases because few liquids are of such value as to make a trivial amount of much consequence, but on the contrary, it will be necessary with some liquids, as, for example, certain chemicals. Also certain liquids expand and contract under the action of heat, certain others have a tendency to generate gases and to foam under the action of heat, certain others spontaneously generate gases, others spontaneously reduce their bulk, in all or some of which cases an air space at the top of the measuring receptacle or vessel may be desirable. It will be seen that these incidents can be compensated for and results equalized by placing the valve higher or lower relative to the top of the measuring device and increasing or decreasing the area of the pipe 36 and the capacity of the valve.

The measuring devices being all filled, the flow of liquid to them will be stopped by appropriate manipulation of the lever 9, which simultaneously shuts all the stop cocks 6. The levers 18 will then be alternately manipulated, whereby, through the operation of their co-acting parts, the two sets of stop cocks 14 will be alternately opened and the liquid in the measuring receptacles permitted to pass into the funnels 13 and from them into the cans 26, as is well understood, and as the liquid in the measuring receptacles begins to subside, the valves 37 will drop, permitting the entrance of air to the measuring receptacles.

It will be particularly noted that the automatic valve may be used not only to exactly determine the amount of inflow of the liquid, but also, as in the case illustrated, will permit an excess of liquid, which will ultimately pass to the vessels to be filled, but also that it may be used to determine the amount of air retained in the measuring devices, and the area of the air space, and also that this same valve, on the recession of the liquid from the measuring devices, is the means whereby the air may again enter, thus securing rapid flow of the liquid from the measuring devices.

The individual faucets 23 for each funnel are supplied so that should any can develop structural defects, in other words, leak, then the flow of liquid to that particular can may be cut off, without interfering with the flow to the other cans. Of course in such event, the contents of the funnel for the defective can and of the can itself, will have to be drawn off and subsequently returned to the source of supply, in order that the subsequent automatic filling of the succeeding sets of cans may not be interfered with.

It will be obvious to those who are familiar with such matters that while the apparatus above described and illustrated is a desirable form in which to embody my invention for the filling of oil cans, it is by no means the only form even for that purpose. Also some of the appliances shown will be unnecessary for filling cans with liquids other than oil. Similarly, in some instances, it will be desirable, if not necessary, to have devices present which I have not illustrated. I therefore do not limit myself in any respect to the details shown and described.

I do not herein claim the valve construction described and illustrated herein since that will form the subject matter of another application for Letters Patent about to be filed by me.

I claim:

1. In apparatus of the class stated, a stationary reservoir, a series of stationary measures each connected directly with the reservoir, means outside each measure and outside the reservoir to simultaneously permit and prevent the flow of liquid from the reservoir to each measure, an air vent connected with but outside of each measure, a valve in each vent automatically closed by the rise of the liquid in the measure and automatically opened by its subsidence therefrom, a series of funnels below the measures, means to simultaneously permit and prevent the flow of liquid from the measures to the funnels, and separately operated means connected with each funnel and accessible from the exterior thereof to permit and prevent the flow of liquid from each funnel to the individual vessel with which it co-acts.

2. In apparatus of the class stated, a stationary reservoir, a series of stationary measures each connected directly with the reservoir, means outside each measure and outside the reservoir to simultaneously permit and prevent the flow of liquid from the reservoir to each measure, an air vent connected with but outside of each measure, a valve in each vent automatically closed by the rise of the liquid in the measure and automatically opened by its subsidence therefrom, a double series of funnels below the measures, means to permit and prevent the flow of liquid from the measures to one or the other of the series of funnels and separately operated means connected with each funnel and accessible from the exterior thereof to permit and prevent the flow of liquid from each individual funnel to the individual vessel with which it co-acts.

In testimony whereof I have signed my name to this specification.

FREDERICK C. HELMUTH.